US007668227B2

United States Patent
Grant et al.

(10) Patent No.: US 7,668,227 B2
(45) Date of Patent: Feb. 23, 2010

(54) METHOD AND APPARATUS FOR REDUCING INTERFERENCE IN SPREAD SPECTRUM SIGNALS USING SPREADING CODE CROSS-CORRELATIONS

(75) Inventors: Stephen J. Grant, Cary, NC (US); Jung-Fu Cheng, Cary, NC (US); Leonid Krasny, Cary, NC (US); Karl J. Molnar, Cary, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 646 days.

(21) Appl. No.: 11/443,883

(22) Filed: May 31, 2006

(65) Prior Publication Data

US 2006/0256843 A1    Nov. 16, 2006

Related U.S. Application Data

(63) Continuation-in-part of application No. 10/795,101, filed on Mar. 5, 2004, now Pat. No. 7,339,980.

(60) Provisional application No. 60/689,477, filed on Jun. 10, 2005.

(51) Int. Cl.
*H04B 1/00* (2006.01)

(52) U.S. Cl. ...................................... 375/148

(58) Field of Classification Search ............... 375/142, 375/143, 150, 152, 267, 299, 343, 347, 349, 375/148; 704/216, 218, 237, 263; 708/5, 708/422, 813; 342/108, 145, 189, 378; 700/53; 455/101, 132–141
See application file for complete search history.

(56) References Cited

U.S. PATENT DOCUMENTS

| 2004/0028013 | A1* | 2/2004 | Fitton et al. ................ 370/335 |
| 2005/0111528 | A1  | 5/2005 | Fulghum et al. |
| 2005/0195889 | A1  | 9/2005 | Grant et al. |
| 2006/0047842 | A1* | 3/2006 | McElwain ................ 709/231 |

OTHER PUBLICATIONS

M.K. Varanasi and T. Guess, "Optimum decision feedback multiuser equalization with successive decoding achieves the total capacity of the Gaussian multiple-access channel." In *Proc. Assilomar Conf. on Signals, Systems, and Computers*, Monteray, CA, Nov. 1997, pp. 1405-1409.

(Continued)

*Primary Examiner*—Sam K Ahn
(74) *Attorney, Agent, or Firm*—Coats & Bennett, PLLC

(57) ABSTRACT

A receiver reduces interference in a received symbol of interest attributable to an interfering symbol using knowledge of the symbol spreading codes. The receiver comprises a plurality of correlators generating despread values for the received symbol of interest and the interfering symbol, and a combiner to combine the despread values using combining weights calculated based on spreading code correlations between spreading codes for the received symbol of interest and the interfering symbol.

41 Claims, 10 Drawing Sheets

OTHER PUBLICATIONS

S.T. Chung, A. Lozano, and H.C. Huang, "Approaching eigenmode BLAST channel capacity using V-BLAST with rate and power feedback," in *Proc. IEEE VTC'01-Fall*, Atlantic City, NJ, Oct. 2001.

G.E. Bottomley, T. Ottosson, and Y.-P.E. Wang, "A generalized RAKE receiver for interference suppression," *IEEE J. Select. Areas Commun.*, vol. 18, pp. 1536-1545, Aug. 2000.

S. Grant, J.-F. T. Cheng, L. Krasny, K. Molnar, and Y.-P. E. Wang, "Per-Antenna-Rate-Control (PARC) in Frequency Selective Fading with SIC-GRAKE Receiver," in *Proc. IEEE VTC'4-Fall*, Los Angeles, CA, Sep. 2004, pp. 1458-1462.

S. J. Grant, K. J. Molnar, and G.E. Bottomley, "Generalized RAKE Receivers for MIMO Systems," in *Proc. VTC'03-Fall*, Orlando, FL, Oct. 2003, pp. 424-428.

Y.-P. E.. Wang and G. Bottomley, "Generalized RAKE Reception for Cancelling Interference from Multiple Base Stations," 2000 IEEE, pp. 2333-2339.

\* cited by examiner

METHOD AND APPARATUS FOR REDUCING INTERFERENCE IN SPREAD SPECTRUM SIGNALS USING SPREADING CODE CROSS-CORRELATIONS

RELATED APPLICATIONS

This application claims the benefit of U.S. Provisional Patent Application 60/689,477 filed Jun. 10, 2005, which is incorporated herein by reference, and is a continuation-in-part (CIP) of U.S. patent application Ser. No. 10/795,101 filed on Mar. 5, 2004 now U.S. Pat. No. 7,339,980.

BACKGROUND OF THE INVENTION

The present invention relates generally to interference cancellation in direct sequence spread spectrum systems, and, more particularly, to a novel RAKE receiver that uses spreading code cross-correlations to compute combing weights so as to reduce interference in the RAKE output signals.

Emerging third-generation (3G) wireless communication systems support several different kinds of services including voice, high-speed packet data and multimedia services. Further, 3G systems allow users to access several different services simultaneously. To meet the demand for these services, future wireless communication systems will need to provide much higher capacity than second-generation (2G) systems. Greater capacity can be obtained by allocating additional bandwidth, which is unlikely to occur, or by utilizing the allocated bandwidth more efficiently.

WCDMA (Wideband Code Division Multiple Access) is one technology that is expected to help fulfill the demand for 3G services. WCDMA is a direct sequence, spread spectrum communication system that uses spreading codes to spread narrowband signals over the full width of the frequency channel. Each user transmits over a separate code channel and may transmit simultaneously with other users. Signals from multiple users combine during transmission over the communication channel so that the receiver sees the sum of all users' signals that overlap in time and frequency.

Current implementations of WCDMA use a single-user receiver called a RAKE receiver that separately detects signals from each user without considering other users. The RAKE receiver includes a plurality of RAKE fingers, each of which is matched to a single user's spreading code but aligned with different time delays to detect different multipath echoes of the user's signal. Each RAKE finger includes a correlator that uses the particular spreading code assigned to the user to despread that user's signal. Signals from all other users are treated as noise. A RAKE combining circuit combines the despread signals output from each RAKE finger to obtain a combined signal with an improved signal to noise ratio (SNR).

The conventional RAKE receiver is optimal in white noise. However, time dispersion of the propagation channel results in frequency-selective fading for a wideband signal. As a result, interference caused by other users' signals, i.e., multiple access interference (MAI), and own-signal intersymbol interference (ISI) is colored. MAI is due to cross-correlation between different spreading codes in multipath fading channels. ISI is due to distortion of the transmitted signal that occurs in multipath channels. MAI and ISI limit the capacity of CDMA systems. Also, when colored MAI and ISI are present, the conventional RAKE receiver is not optimal.

Recently, single-antenna Generalized RAKE (GRAKE) receivers have been developed for better suppressing interference. Interference suppression is achieved by treating ISI and MAI as colored Gaussian noise. The noise correlation across fingers is then exploited by adapting the finger delays and combining weights. In this way, the orthogonality between user signals may be partially restored. GRAKE receivers are described in U.S. Pat. No. 6,363,104, and in U.S. patent application Ser. Nos. 09/344,898 and 09/344,899, which are incorporated herein by reference.

In DS-CDMA systems, such as Wideband CDMA and IS-2000, high transmission data rates are achieved by transmitting data at a low spreading factor and/or on more than one spreading code (multi-code). When a low spreading factor and/or multi-code is used, performance is sensitive to multipath dispersion. With dispersion, there are multiple echoes of the transmitted signal with different relative delays. These echoes interfere with one another. Not only is orthogonality lost between successive symbols as one symbol overlaps with the next, but orthogonality is also lost between symbols sent on different, orthogonal codes.

SUMMARY OF THE INVENTION

The present invention relates to a receiver architecture for processing received spread spectrum signals containing one or more signals of interest and one or more interfering signals to reduce interference in the signals of interest attributable to the interfering signals. The receiver includes a despreading circuit to despread a received spread spectrum signal to generate despread values corresponding to the signals of interest and the interfering signals. The receiver further includes one or more signal detection circuits to detect the signals of interest. In some embodiments, a single signal detection circuit jointly detects all signals of interest. In other embodiments, a plurality of signal detection circuits detect respective ones of the signals of interest. The signal detection circuits may be arranged in series to perform successive interference cancellation.

The signal detection circuits include GRAKE combining circuits to combine the despread values using combining weights calculated based on spreading code correlations between the signals of interest and the interfering signals. The spreading code correlations include correlations between the spreading codes for different signals of interest, as well as spreading code correlations between spreading codes for the signals of interest and interfering signals. An impairment estimator computes the spreading code correlations and a combining weight calculator calculates the combining weights based on the impairment correlations. The impairment correlation estimator may further calculate impairment correlations between the signals of interest and pilot signals contained in the received spread spectrum signals, or between the signals of interest and unknown interfering signals contained in the received spread spectrum signals that have been spread with unknown spreading codes. In some embodiments, pilot signals contained in the spread spectrum signal may be subtracted prior to despreading.

DETAILED DESCRIPTION OF THE INVENTION

Figure 1:
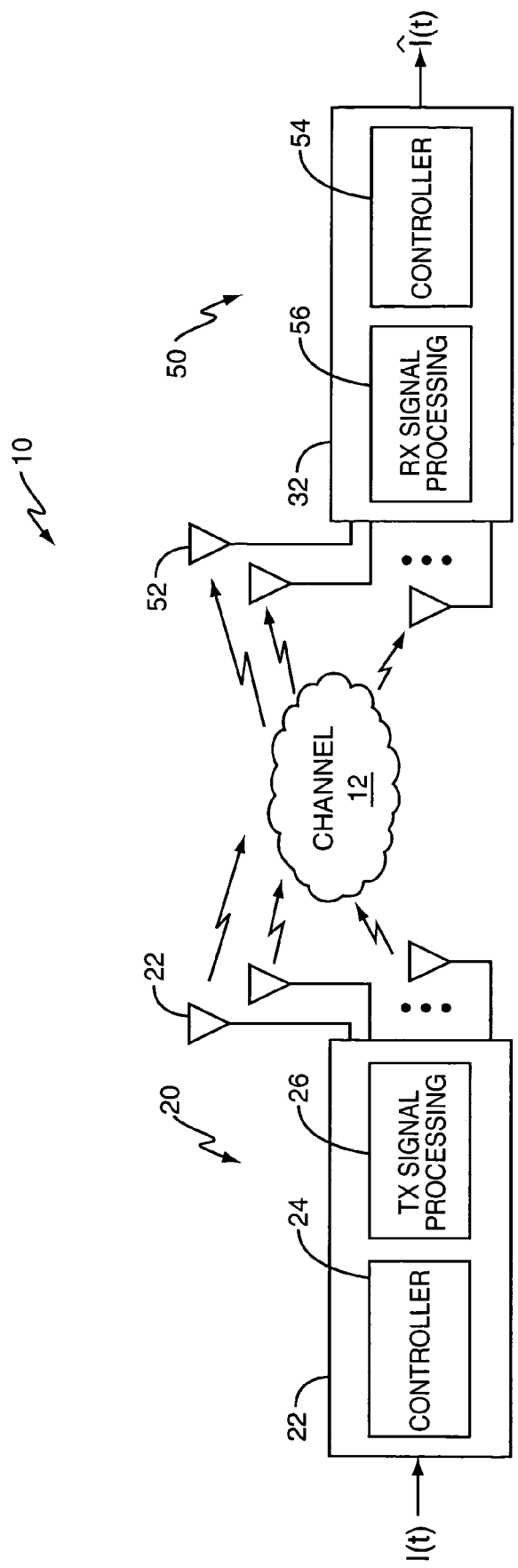
FIG. 1 is a schematic diagram of a multiple input/multiple output (MIMO) including a transmitter and receiver with multiple antennas.

FIG. 1 illustrates a multiple input/multiple output (MIMO) wireless communication system indicated generally by reference numeral 10, which may be used for example on the High Speed Downlink Packet Access (HSDPA) channel in Wideband Code Division Multiple Access (WCDMA) systems. MIMO system 10 comprises a transmitter 20 having M transmit antennas 22 and a receiver 50 having L receive antennas 52. In one exemplary embodiment, the transmitter 20 is a base station in a wireless communication network and the receiver 50 is mobile station.

An information signal I(t) in the form of a binary data stream is input to the transmitter 20. The transmitter 20 includes a controller 24 and a transmit signal processing circuit 26. The controller 24 controls operation of the transmitter 20. The transmit signal processing circuit 26 performs error correction coding, maps of the encoded bits to modulation symbols, and generates transmit signals for each transmit antenna 22. After upward frequency conversion, filtering, and amplification, the transmit signals are transmitted from respective transmit antennas 22 through a communication channel 12 to the receiver 50.

The receiver 50 includes a controller 54 and a receive signal processing circuit 56. The controller 54 controls operation of the receiver 50. The receive signal processing circuit 56 demodulates and decodes the composite signals received at each receive antenna 52 to generate an estimate $\hat{I}(t)$ of the original information signal I(t). In the absence of bit errors, the estimate $\hat{I}(t)$ output from the receiver 50 will be the same as the original information signal I(t) input at the transmitter 20. Because multiple data streams are transmitted in parallel from different transmit antennas 22, there is an increase in throughput with every pair of transmit and receive antennas 22, 52 added to the system without an increase in the bandwidth requirement.

Figure 2:
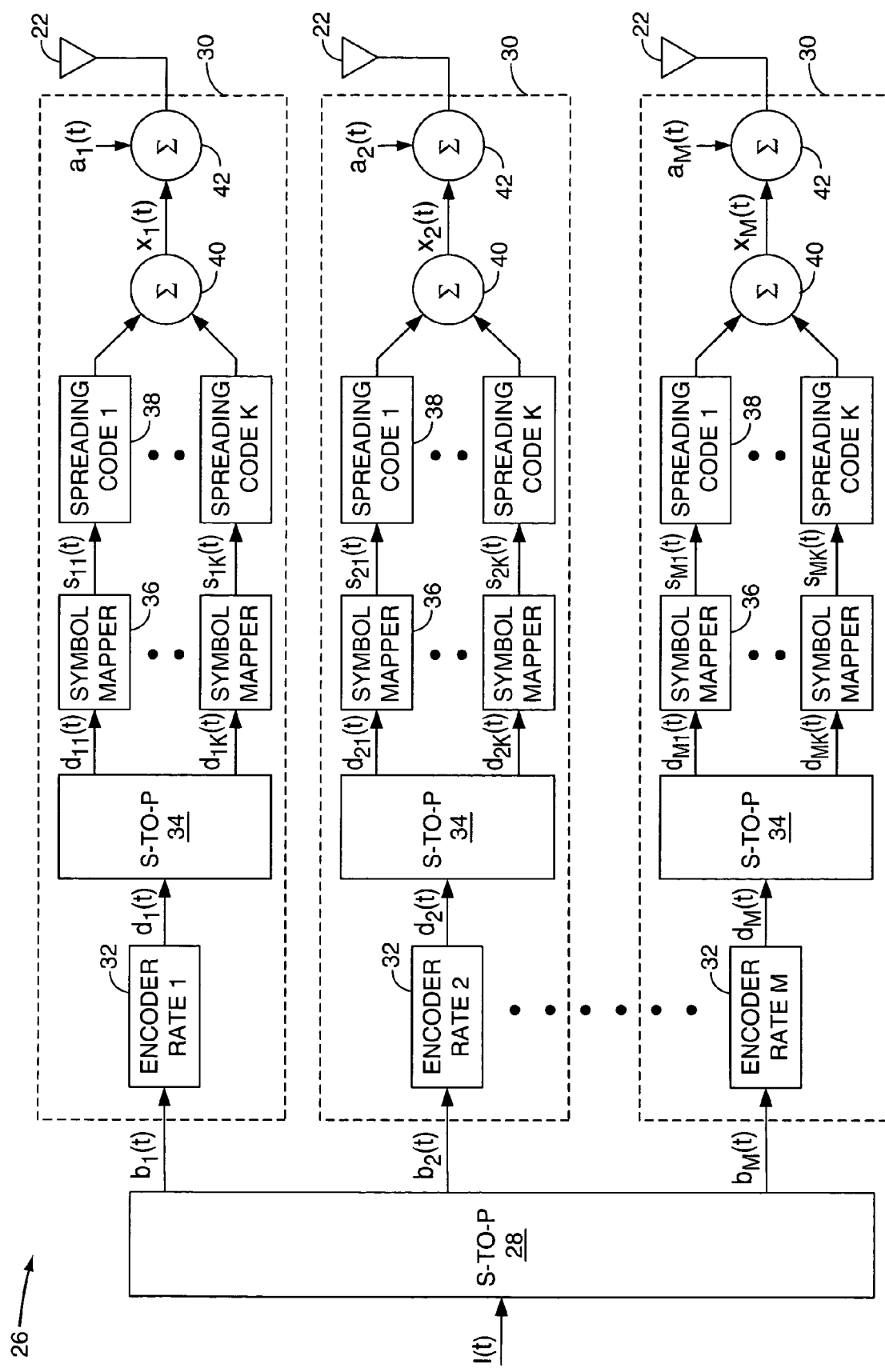
FIG. 2 is an exemplary PARC transmitter implementing per antenna rate control (PARC) for the MIMO communication system shown in FIG. 1.

FIG. 2 illustrates the transmit signal processor 26 in one exemplary embodiment configured for Per Antenna Rate Control (PARC). PARC is a multiple stream transmitting technique used in wireless communication systems to increase system capacity. A serial-to-parallel converter 28 divides the original information bit stream I(t) into M bit streams $\{b_1(t), b_2(t), \ldots b_M(t)\}$, which are input to respective coding and modulation circuits 30. In this embodiment, the uncoded bit streams input to the coding and modulation circuits 30 are the signals of interest detected by the receiver 50. The coding and modulation circuit 30 for the mth bit stream $b_m(t)$ comprises an encoder 32, serial-to-parallel converter 34, symbol mappers 36, signal spreaders 38, multicode combiner 40, and final combiner 42. Encoder 32 encodes the mth bit stream $b_m(t)$ to generate a coded data stream $d_m(t)$. The encoders 32 for different transmit antennas 22 encode the original information bits at different rates. The rates depend on the channel quality indicator (CQI) feedback from the receiver 50. Serial-to-parallel converter 34 divides the coded signal output by a respective encoder 32 into K substreams denoted by $d_{mk}(t)$, which are mapped to modulation symbols $S_{mk}(t)$ by one of K symbol mappers 36 and spread with one of K spreading codes by signal spreaders 38. The K spreading codes may be reused on the different transmit antennas 22. Multicode combiner 40 recombines the K spread signals output from each signal spreader 38 to generate a multi-coded transmit signal $x_m(t)$. A second combiner 42 combines the multi-coded transmit signal $x_m(t)$ with one or more other simultaneously transmitted signals $a_m(t)$ and transmits the composite signal to the receiver 50. The other simultaneously transmitted signals may comprise, for example, voice signals, pilot signals, control signals, dedicated data signals, or a combination thereof. Note that in FIG. 2, the number of data streams and the number of transmit antennas 22 are the same. However, in other embodiments, the number of data streams could be less than the number of transmit antennas 22.

Figure 3:
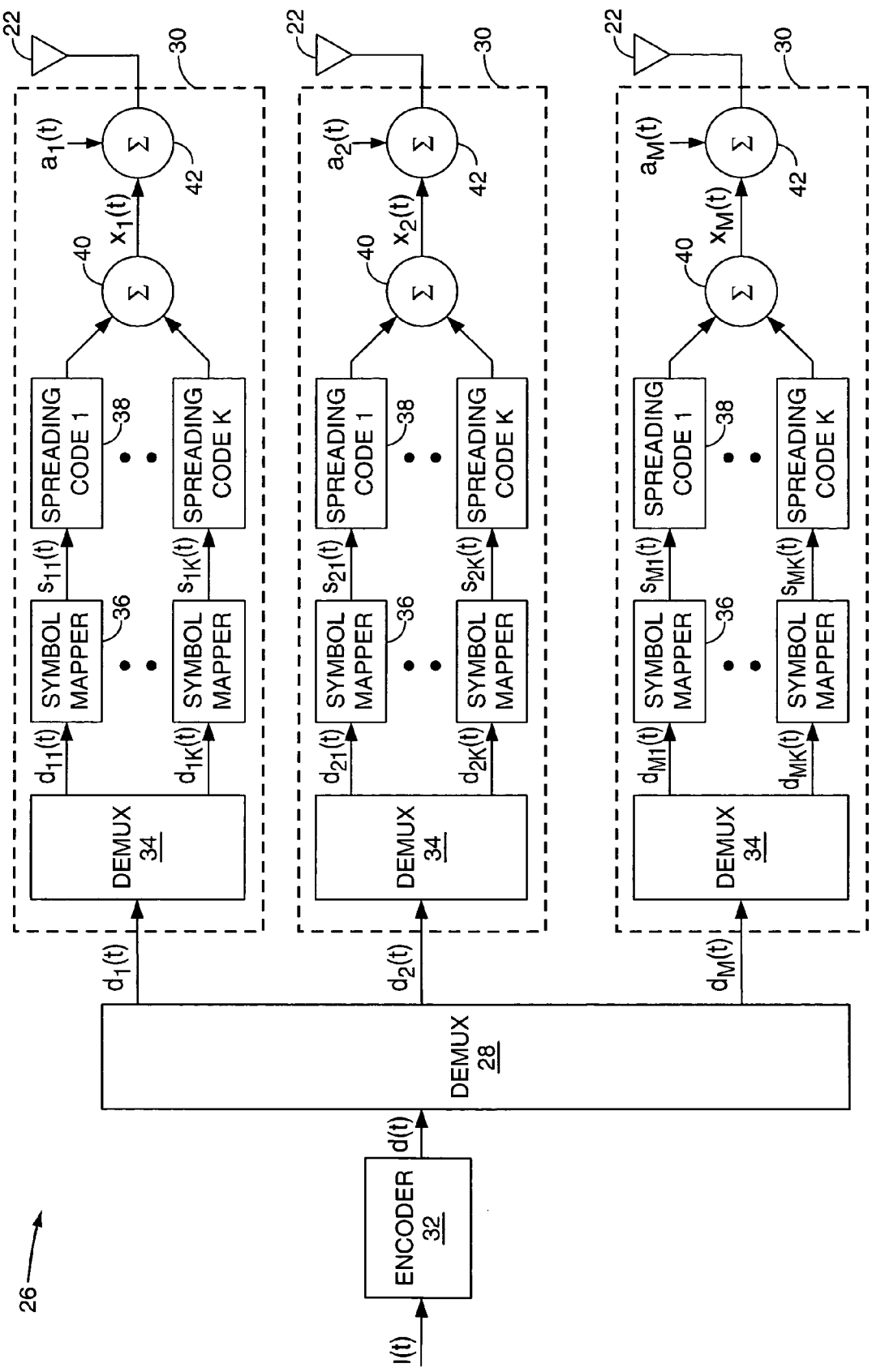
FIG. 3 is an exemplary Spatial Multiplexing (SM) transmitter for the MIMO communication system shown in FIG. 1.

FIG. 3 illustrates an exemplary transmit signal processor 26 configured for spatial multiplexing (SM) with code reuse. The SM transmitter configuration is similar to the PARC transmitter configuration shown in FIG. 2 and therefore the same reference numerals are used too indicate similar components. In contrast to the PARC configuration shown in FIG. 2, the SM configuration shown in FIG. 3 uses a single encoder 32 to encode the original information stream I(t) before serial-to-parallel converter 28 divides it. Serial-to-parallel converter 28 divides the coded information stream d(t) into M data streams $d_m(t)$, which are input to respective coding and modulation circuits 30. In this embodiment, the coded data streams $d_m(t)$ input to each coding and modulation circuit 30 are the signals of interest detected by the receiver 50. The coding and modulation circuit 30 for each antenna 22 comprises a serial-to-parallel 34 to further divide each data stream $d_m(t)$ into a plurality of substreams $d_{mk}(t)$, a plurality of symbol mappers 36 to map each substream to modulation symbols $S_{mk}(t)$, a plurality of signal spreaders 38 to apply a selected spreading code to each symbol stream, a multicode combiner 40 to recombine the spread signals to generate a multi-coded transmit signal $x_m(t)$, and a combiner 42 to combine the multi-coded transmit signal with one or more other simultaneously transmitted signals $\alpha_m(t)$ that contain a number of voice channels, dedicated data channels, control channels, as well as a common pilot channel.

The receiver 50, as previously noted, comprises L receive antennas 52. The received signal $r_1(t)$ from each antenna is input to a received signal processor 56, which processes the received signals $\{r_1(t), r_2(t), \ldots r_L(t)\}$ to generate an estimate $\hat{I}(t)$ of the original information signal I(t). The received signal processor 56 comprises one or more despreading circuits 60 (shown in FIG. 4) to generate despread signals, one or more RAKE combining circuits 70 (shown in FIGS. 5 and 6) to combine the despread signals to generate RAKE output signals, and one or more decoding circuits 80 (shown in FIGS. 5 and 6) to demodulate and decode the RAKE output signals.

Figure 4:
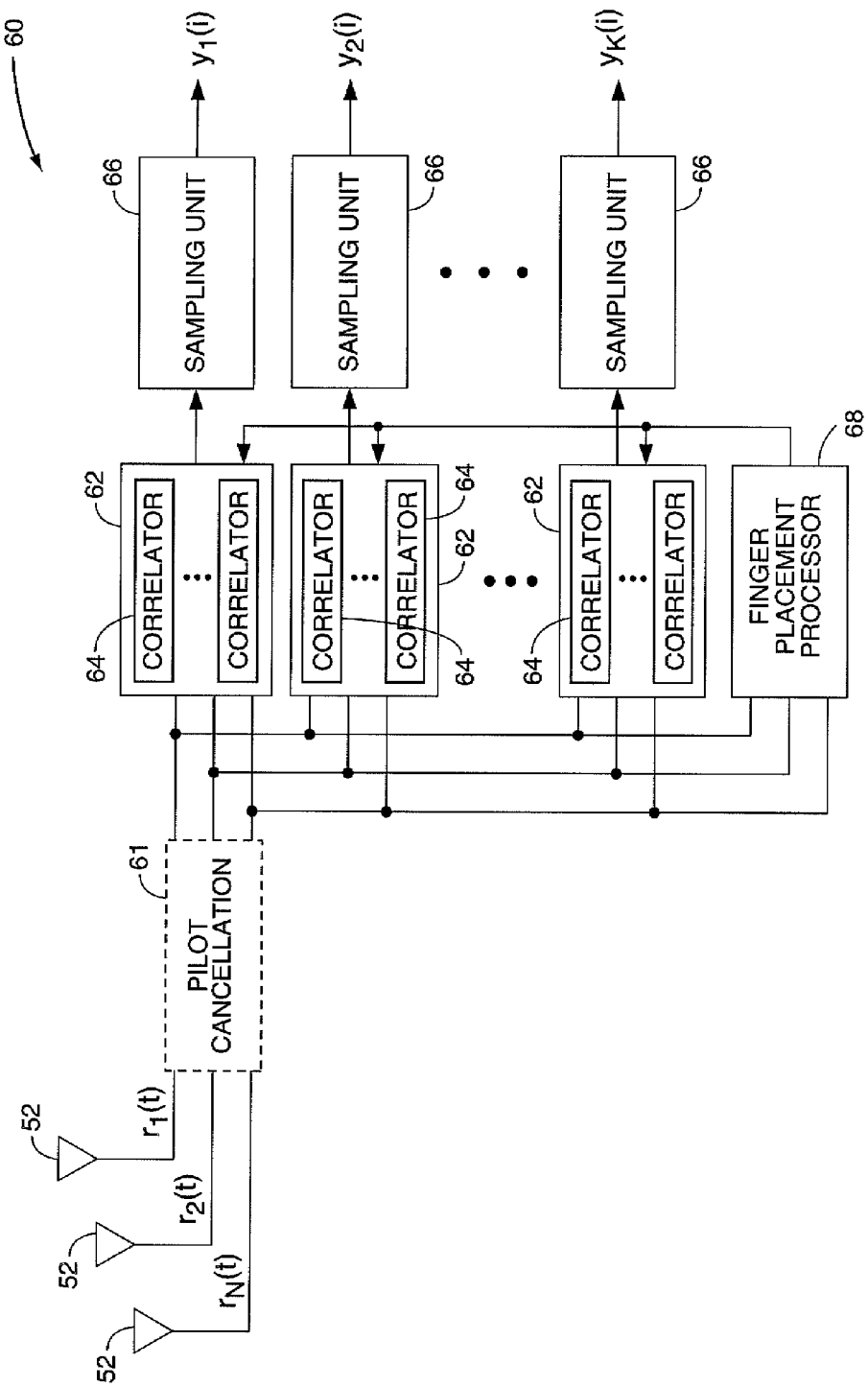
FIG. 4 illustrates an exemplary despreading unit for a receiver in the MIMO communication system shown in FIG. 1.

FIG. 4 illustrates an exemplary despreading circuit 60 for the receiver 50. Despreading circuit 60 comprises a plurality of correlator banks 62 and a plurality of sampling units 66. While not required, some embodiments may also include a pilot cancellation circuit 61 that subtracts the pilot signals contained in the received signal before despreading. It will be appreciated that while FIG. 4 shows the pilot cancellation circuit 61 as part of the despreading circuit 60, the pilot cancellation circuit 61 may be disposed externally to the despreading circuit 60. Each correlator bank 62 comprises a plurality of correlators 64, also known as RAKE fingers, tuned to one of the K spreading codes and spanning the multiple receive antennas 52. Each correlator bank 62 may have multiple fingers or correlators 64 matched to each transmit antenna 22. A finger placement processor 68 selects the finger delays of the RAKE fingers comprising each correlator bank 62 in the same manner as a conventional single-antenna GRAKE receiver. For example, finger placement processor 68 may place the RAKE fingers to maximize the signal to interference plus noise ratio (SINR) at the output of the GRAKE combining circuit 70. The RAKE finger outputs are then sampled at the symbol intervals by sampling units 66 to generate a plurality of despread vectors denoted $y_k(i)$ at each ith symbol interval. The subscript k indicates the code channel. The despread vector $y_k(i)$ represents a composite of M coded signals transmitted from M transmit antennas 120 over the kth code channel.

Figure 5:
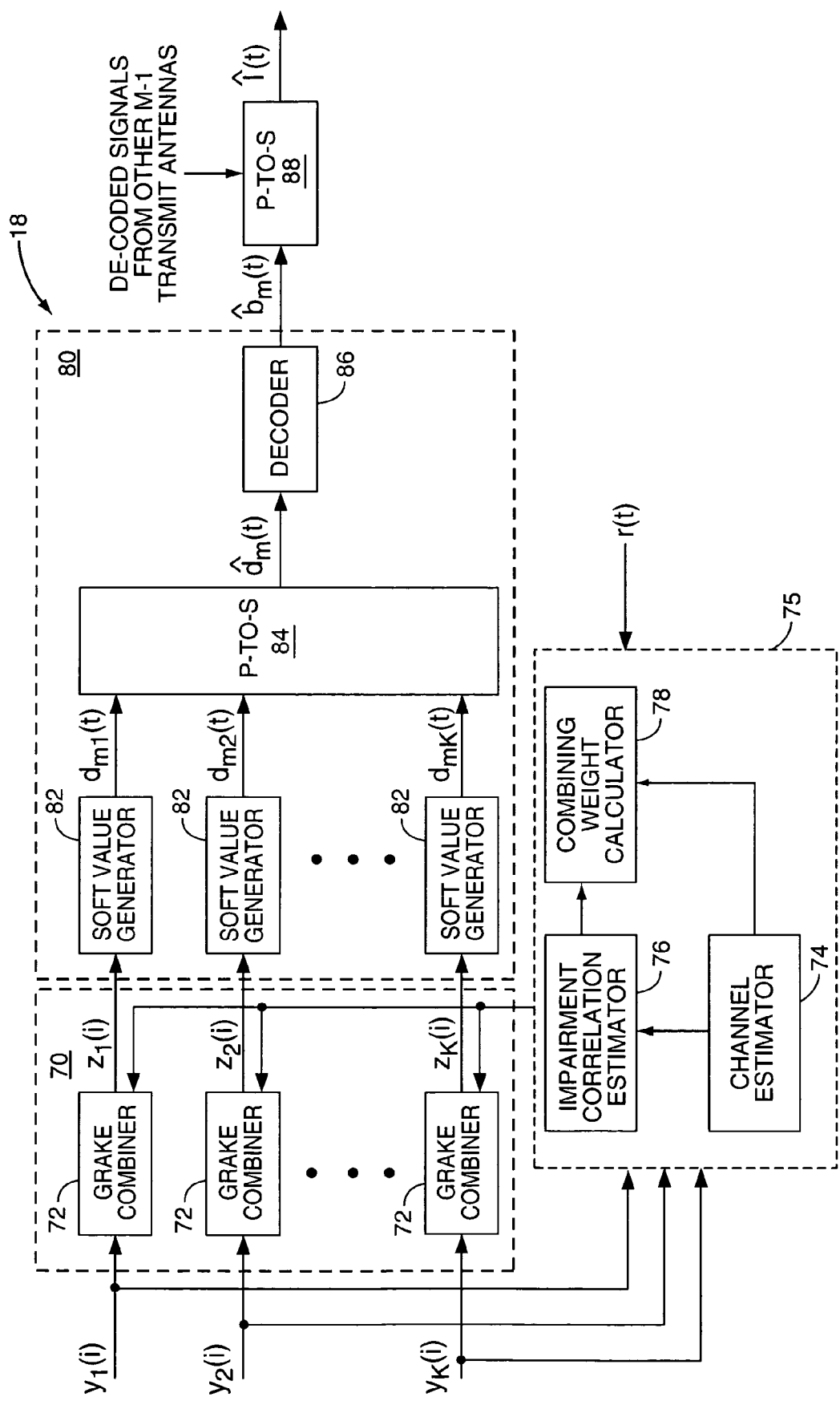
FIG. 5 illustrates exemplary receive signal processing circuits configured for use with a PARC transmitter in the MIMO communication system of FIG. 1.

FIG. 5 illustrates an exemplary RAKE combining circuit 70 and decoding circuit 80 associated with the mth transmit antenna 22 for a code-specific MMSE-GRAKE (CS-MMSE-GRAKE) receiver configured for use with the PARC transmitter shown in FIG. 2. The RAKE combining circuit 70 and decoding circuit 80 comprise a signal detection circuit. There is one signal detection circuit for each transmit antenna 22 or signal of interest.

RAKE combining circuit 70 comprises K GRAKE combiners 72, each of which are matched to the mth antenna. Thus, there is one GRAKE combiner 72 for each code channel k. Each GRAKE combiner 72 combines the despread vector $y_k(i)$ using a combining weight vector $w_{mk}(i)$ to generate a GRAKE output signal $z_{mk}(i)$ that corresponds to one of the data substreams $d_{mk}(t)$. The RAKE combining weight vector $w_{mk}(i)$ is calculated by combining weight generator 75 based on the estimates of the communication channel from the mth transmit antenna 22 and a despread covariance matrix. Combining weight generator 75 includes a channel estimator 74, covariance estimator 76 and combining weight calculator 78. Alternatively, the combining weight generator 75 may estimate impairment covariance instead of despread covariance. Channel estimator 74 generates channel estimates for the covariance estimator 76 and combining weight estimator 78. The covariance estimator 76 calculates despread value correlations that are used by the combining weight estimator 78 based on the channel estimates and spreading codes. The combining weight estimator 78 determines the combining weights based on the despread covariance provided by the covariance estimator 76 and the channel estimates provided by the channel estimator 74. The combining weight vector $w_{mk}(i)$ for the mth transmit antenna 22 and the kth multicode is given by $$w_{mk}(i) = R_y^{-1}(k,i) h_{mk}(i) \quad (1.1)$$

where $R_y(k,i)$ is the despread covariance matrix and $h_{mk}(i)$ is the net response vector of the channel from the mth transmit antenna 22. As will be described in more detail below, the despread covariance matrix $R_y(k,i)$ takes into account cross-correlations between spreading codes used to spread the data substreams $d_{mk}(t)$ to reduce intersymbol interference (ISI) and multiple access interference (MAI) due to code reuse. For the CS-MMSE-G RAKE receiver shown in FIG. 5, the despread covariance matrix $R_y(k,i)$ is the same for all transmit antennas 22. The net response vector $h_{mk}(i)$, however, will vary for each transmit antenna 22 making the RAKE combining weights different for each transmit antenna 22.

The GRAKE output signals $z_{m,k}(i)$ are supplied to the decoding circuit 80 for demodulation and decoding. Decoding circuit 80 comprises a plurality of soft value generators 82, parallel-to-serial converters 84 and 88, and decoder 86. Each soft value generator 82 receives a corresponding GRAKE output signal $z_{m,k}(i)$ and generates soft values corresponding to one of the data substreams $d_{mk}(t)$. The soft values are input to parallel-to-serial converter 84 which converts the parallel soft value streams into a single serial soft value stream corresponding to one data stream $\hat{d}_m(t)$. In the case of a PARC transmitter 20, the soft value stream $\hat{d}_m(t)$ is input to a decoder 86 to obtain a decoded bit stream $\hat{b}_m(t)$ corresponding to the signal of interest transmitted from the mth antenna 22. A second parallel-to-serial converter 88 receives the decoded bit streams $\hat{b}_m(t)$ for all transmit antennas 22 and outputs an estimate $\hat{I}(t)$ the original information stream $\hat{I}(t)$.

Figure 6:
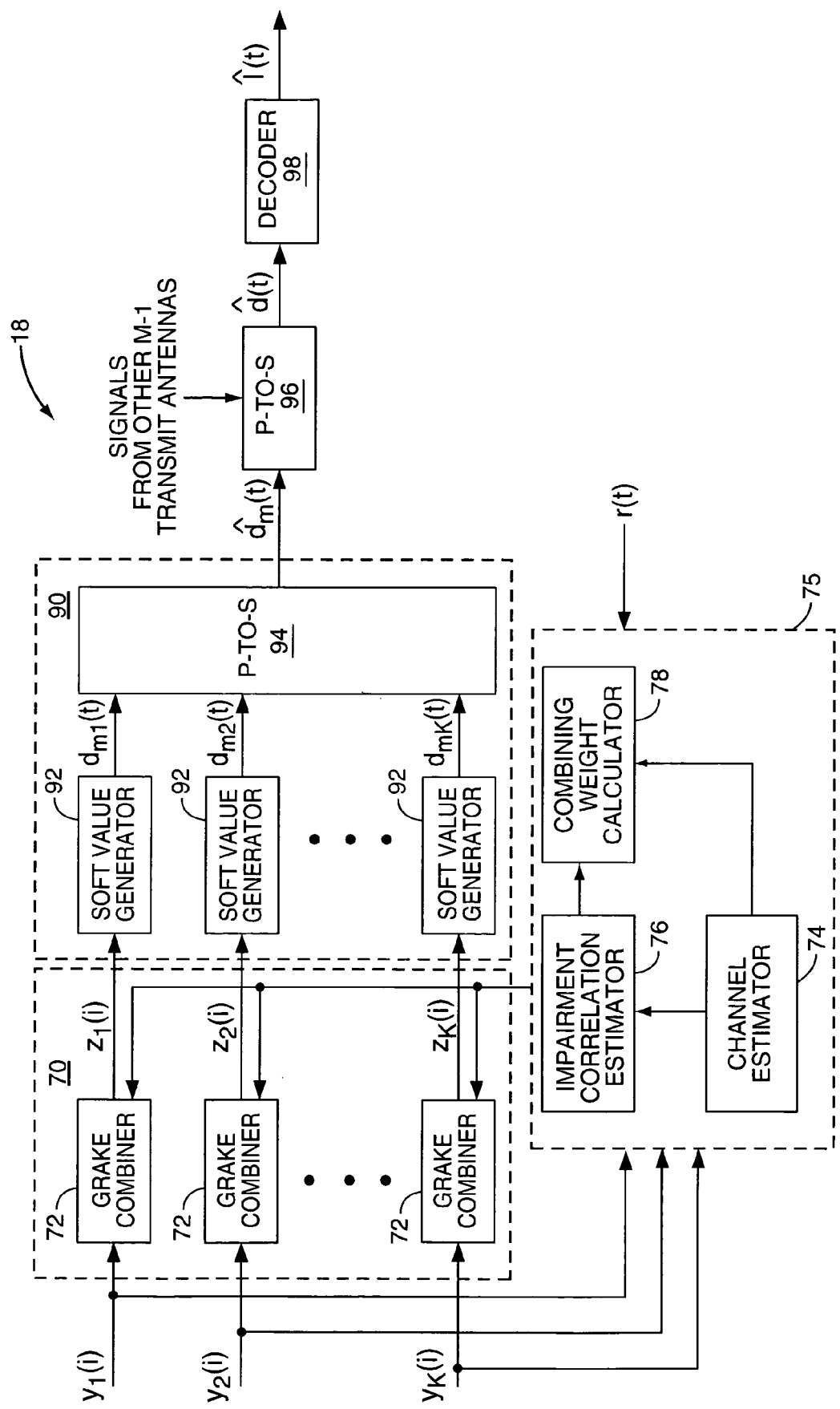
FIG. 6 illustrates exemplary receive signal processing circuits configured for use with a SM transmitter in the MIMO communication system of FIG. 1.

FIG. 6 illustrates a code specific MMSE GRAKE (CS-MMSE-GRAKE) receiver 50 configured for use with the SM transmitter configuration shown in FIG. 3. In this embodiment, the signal detection circuit comprises a GRAKE combining circuit 70 and demodulation circuit 90. The demodulation circuit comprises a plurality of soft value generators 92 and a parallel-to-serial converter 94. Each soft value generator 92 receives a corresponding GRAKE output signal $z_{m,k}(i)$ and generates soft values corresponding to one of the data substreams $d_{mk}(t)$. The soft values are input to parallel-to-serial converter 94 which converts the parallel soft value streams into a single serial soft value stream corresponding to one data stream $\hat{d}_m(t)$. The output of the demodulation circuit 90 is a soft value stream corresponding to one of the signals of interest. The soft value stream output from the demodulation circuit 90 is input to a parallel-to-serial converter 96, which combines the signal of interest with other signals of interest transmitted from other transmit antennas 22. The combined stream output by the parallel-to-serial converter 96 is then input to a decoder 98.

In the embodiments shown in FIGS. 5 and 6, the GRAKE combiners 72 use knowledge of the spreading codes assigned to the HSDPA channel to reduce intersymbol interference (ISI) and multiple access interference (MAI) and to generate a scalar decision statistic $z_{m,k}(i) = w^H_{m,k}(i) y_k(i)$. The combining weight vector used by each G-RAKE combiner 72 is a function of the despread covariance matrix $R_y(k,i)$ and net response vector $h_{mk}(i)$. We assume the qth G-RAKE finger is allocated to receive antenna l, and thus the qth element of the net response vector corresponding to the qth GRAKE finger is given by $$\{h_{mk}(i)\}_q = \sqrt{\frac{\alpha_s(m) E_T}{K}} \sum_{p=1}^{P} g_{lmp} r_{kkl0}(\tau_q - \tau_p) \quad (1.2)$$

where $g_{lmp}$ and $\tau_p$ are the tap gains and delays of the P-tap multipath channel between the mth transmit antenna 22 and the lth receive antenna 52, and $\alpha_s(m) E_T/K$ is the energy allocated to each of the K multicodes for the mth transmit antenna 22. The net response vector $h_{mk}(i)$ is a function of the autocorrelation function $r_{kkl0}$ of the kth multicode during the Ah symbol period.

The despread covariance matrix $R_y(k,i)$ is a function of the waveform correlation function denoted by $r_{knij}(\tau)$. The waveform correlation function $r_{knij}(\tau)$ describes the cross-correlation between the spreading waveform for the kth spreading code during the ith symbol period and the spreading waveform for the nth spreading code during the (i-j)th symbol period, evaluated at time lag $\tau$. The waveform correlation function is given by $$r_{knij}(\tau) = \frac{1}{SF} \sum_{u=1-SF}^{SF-1} C_{knij}(u) x(\tau - uT_C) \quad (1.3)$$

where $C_{knij}(u)$ is the aperiodic cross-correlation function between the spreading codes, $x(\tau)$ is the chip pulse autocorrelation function, SF is the spreading factor, and $T_C$ is the chip period. The cross-correlation function is defined as:

$$C_{knij}(u) = \begin{cases} \sum_{m'=0}^{SF-1-u} m_{n,i-j}(m') m_{k,i}^*(m'+u) & u \geq 0 \\ \sum_{m'=0}^{SF-1+u} m_{n,i-j}(m'-u) m_{k,i}^*(m') & u < 0 \end{cases} \quad (1.4)$$

where $m_{n,i}(m)$ is the mth chip of the spreading sequence in the ith symbol period for the nth spreading code. Due to long code scrambling, the spreading code cross-correlation function $C_{knij}(\mu)$, and hence the waveform correlation function, $r_{knij}(\tau)$, is a function of the symbol period index i. Consequently, the code-specific combining weights vary from one symbol period to the next.

The waveform-correlation function $r_{knij}(\tau)$ is used to calculate the despread covariance matrix, which is given by $$R_y(k,i) = R_s(k,i) + R_p(k,i) + R_v + R_n(k,i) \quad (1.5)$$

The matrix $R_s(k,i)$, referred to herein as the multicode covariance matrix, captures the interference attributable to the use of multiple transmit antennas 22 and multiple spreading codes on the HSDPA channel. This matrix accounts for self-interference arising from reuse of the multicodes on multiple antennas, intersymbol interference (ISI) due to channel dispersion, and inter-code interference attributable to the use of multiple spreading codes on each transmit antenna 22. The inter-code interference includes inference attributable to the use of the other K-1 codes on all transmit antennas 22. The matrix $R_p(k,i)$, referred to herein as the pilot covariance matrix, captures despread values attributable to the pilot signals on all transmit antennas 22. The matrix $R_v$, referred to as the multiple access covariance matrix, captures the despread values attributable to other signals transmitted in the same cell on voice, dedicated data, and overhead channels. Because the spreading codes for these signals are not known, this impairment is suppressed by utilizing a correlation matrix in which the spreading codes of the desired signal and interfering signals are averaged out. Thus, this impairment is not a function of the code and time indices. The matrix $R_n(k,i)$, referred to herein as the noise impairment matrix, captures interference attributable to noise.

In the following discussion, we assume the $q_1$th and $q_2$th fingers are allocated to receive antennas $l_1$ and $l_2$, respectively. The $\{q_1,q_2\}$th element of the multicode impairment matrix $R_s(k,i)$ is given by $$\{R_s(k,i)\}_{q_1,q_2} = E_T \sum_{m'=1}^{M} \frac{\alpha_s(m')}{K} \cdot \sum_{p_1=1}^{P} \sum_{p_2=1}^{P} g_{l_1 m' p_1} g_{l_2 m' p_2}^* \sum_{n=1}^{K} \sum_{j=-\infty}^{\infty} r_{knij}(jT + \tau_{q_1} - \tau_{p_1}) r_{knij}(jT + \tau_{q_2} - \tau_{p_2}) \quad (1.6)$$

The $\{q_1,q_2\}$th element of the pilot covariance matrix $R_p(k,i)$ is given by $$\{R_p(k,i)\}_{q_1,q_2} = E_T \sum_{m=1}^{M} \alpha_p(m) \sum_{p_1=1}^{P} \sum_{p_2=1}^{P} g_{l_1 m p_1} g_{l_2 m p_2}^* \sum_{j=-\infty}^{\infty} r_{kmij}^{(pilot)}(jT + \tau_{q_1} - \tau_{p_1}) r_{kmij}^{(pilot)}(jT + \tau_{q_2} - \tau_{p_2}) \quad (1.7)$$

In the pilot covariance matrix, the function $r_{kmij}^{(pilot)}(\tau)$ describes the cross-correlation between the spreading waveform for the kth spreading code in the symbol period and the spreading waveform for the pilot code on the kth transmit antenna 22 in the (i-j)th symbol period and $\alpha_p(m)E_T$ is the energy allocated to the pilot channel for the mth antenna 22. If the pilot signal is subtracted from the received signal before despreading, the pilot despread matrix can be omitted from the despread covariance matrix calculation.

The $\{q_1,q_2\}$th element of the multiple access covariance matrix is given by $$\{R_v\}_{q_1,q_2} = \frac{E_T}{SF} \sum_{m=1}^{M} \alpha_v(m) \cdot \sum_{p_1=1}^{P} \sum_{p_2=1}^{P} g_{l_1 m p_1} g_{l_2 m p_2}^* \sum_{\substack{u=-\infty \\ u \neq 0}}^{\infty} x(uT + \tau_{q_1} - \tau_{p_1}) x * (uT + \tau_{q_2} - \tau_{p_2}) \quad (1.8)$$

The term $\alpha_v(m) E_T$ is the energy allocated to the other channels transmitted on the mth antenna 22. It is assumed that the receiver 50 does not have knowledge of the spreading codes for the voice channels, dedicated data channels, and control channels. Thus, the multiple access covariance matrix accounts for interference attributable to the voice channels and other channels by averaging out the spreading codes. The average value depends only on the chip-pulse $x(\tau)$ autocorrelation function. Thus $R_v$ does not vary from one symbol to the next.

The $\{q_1,q_2\}$th element of the noise covariance matrix is given by $$\{R_n(k,i)\}_{q_1,q_2} = N_o r_{kki0}(\tau_{q_1} - \tau_{q_2}) \delta(l_1 - l_2) \quad (1.9)$$

This matrix is a function of the code and time indices because the noise passes through the despreader tuned to the kth spreading code. The term $r_{kki0}(\tau)$ in Equation 1.9 is the noise autocorrelation function. $N_o$ is the power spectral density of the noise plus other cell interference.

If only one transmit antenna 22 is used at the transmitter 20, Equations 1.1, 1.2, and 1.6-1.11 can be simplified as follows. (The subscripts used to index transmitter will be omitted in our notations.) The combining weight vector for the kth multicode is given by $$w_k(i) = R_y^{-1}(k,i) h_k(i) \qquad (1.10)$$

The element of the net response vector corresponding to the qth GRAKE finger is given by $$\{h_k(i)\}_q = \sqrt{\frac{\alpha_s E_T}{K}} \sum_{p=1}^{P} g_{lp} r_{kki0}(\tau_q - \tau_p) \qquad (1.11)$$

The $\{q_1, q_2\}$th element of the four components of the despread covariance matrix are given by the following expressions $$\{R_s(k,i)\}_{q_1,q_2} = \frac{\alpha_s E_T}{K} \sum_{p_1=1}^{P} \sum_{p_2=1}^{P} g_{l_1 p_1} g_{l_2 p_2}^* \qquad (1.12)$$
$$\sum_{n=1}^{K} \sum_{j=-\infty}^{\infty} r_{knij}(jT + \tau_{q_1} - \tau_{p_1})$$
$$r_{knij}(jT + \tau_{q_2} - \tau_{p_2})$$

$$\{R_p(k,i)\}_{q_1,q_2} = \alpha_p E_T \sum_{p_1=1}^{P} \sum_{p_2=1}^{P} g_{l_1 p_1} g_{l_2 p_2}^* \qquad (1.13)$$
$$\sum_{j=-\infty}^{\infty} r_{kij}^{(pilot)}(jT + \tau_{q_1} - \tau_{p_1})$$
$$r_{kij}^{(pilot)}(jT + \tau_{q_2} - \tau_{p_2})$$

$$\{R_v\}_{q_1,q_2} = \frac{\alpha_v E_T}{SF} \sum_{p_1=1}^{P} \sum_{p_2=1}^{P} g_{l_1 p_1} g_{l_2 p_2}^* \qquad (1.14)$$
$$\sum_{\substack{u=-\infty \\ u \neq 0}}^{\infty} x(uT + \tau_{q_1} - \tau_{p_1}) x*(uT + \tau_{q_2} - \tau_{p_2})$$

$$\{R_n(k,i)\}_{q_1,q_2} = N_o r_{kki0}(\tau_{q_1} - \tau_{q_2}) \delta(l_1 - l_2) \qquad (1.15)$$

In another embodiment of the invention, referred to herein as the code specific joint detection GRAKE (CS-JD-GRAKE) receiver, the signals transmitted from all M transmit antennas 22 during the Ah symbol period are detected jointly, rather than one at a time as in the case of the CS-MMSE-GRAKE described above. It will be recalled that the CS-MMSE-GRAKE applies the weight vector $w_{mk}(i)$ for a selected code channel and a selected antenna 22 to the despread vector $y_k(i)$ to generate a scalar decision statistic. The functional elements of the CS-JD-GRAKE receiver are the same as in the CS-MMSE-GRAKE receiver shown in FIGS. 4 and 6. However, the RAKE combiners 72 apply a weight matrix $w_k(i)$, instead of a weight vector, to the despread vector $y_k(i)$ to generate a vector decision statistic denoted as $z_k(i) = w_k(i) y_k(i)$. The vector decision statistic is then used to generate soft values for all symbols of the joint symbol vector transmitted from all M transmit antennas 22.

For the CS-JD-GRAKE, the combining weight matrix $w_k(i)$ is given by $$w_k(i) = R_x^{-1}(k,i) H_k(i) \qquad (1.16)$$

where $R_x^{-1}(k,i)$ is the despread covariance matrix and $H_k(i)$ is a net response matrix. The mth column of the net response matrix corresponding to the mth transmit antenna 22 is the same as that defined in (1.2).

The despread covariance matrix is given by $$R_x(k,i) = R_s^{JD}(k,i) + R_p(k,i) + R_v + R_n(k,i) \qquad (1.17)$$

The components of the despread covariance matrix $R_x(k,i)$ for the CS-JD-GRAKE are similar to the despread covariance matrix for the CS-MMSE GRAKE described above. However, the computation of the multicode impairment matrix $R_s^{JD}(k,i)$ for the CS-JD-GRAKE receiver, denoted by the superscript JD, may be modified to account for the joint detection. Thus, the $\{q_1, q_2\}$th element of the multicode impairment matrix $R_s^{JD}(k,i)$ is given by $$\{R_s^{JD}(k,i)\}_{q_1,q_2} = E_T \sum_{m'=1}^{M} \frac{\alpha_s(m')}{K} \qquad (1.18)$$
$$\sum_{p_1=1}^{P} \sum_{p_2=1}^{P} g_{l_1 m' p_1} g_{l_2 m' p_2}^* \sum_{n=1}^{K} \sum_{j=-\infty}^{\infty} r_{knij}$$
$$(jT + \tau_{q_1} - \tau_{p_1}) r_{knij}(jT + \tau_{q_2} - \tau_{p_2})$$
$$(1 - \delta(n-k)\delta(j))$$

where $\delta(j) = 1$ if $j=0$ and 0 otherwise. The last three components of the despread covariance matrix are the same is Eq. 1.7, 1.8 and 1.9 above.

To generate the soft bit values, the receiver 50 computes the metric $\lambda_{ki}(c)$ where c is the hypothesized value for the vector of symbols transmitted from all M transmit antennas 22 during the ith symbol period. The metric $\lambda_{ki}(c)$ is given by $$\lambda_{k,i}(c) = \text{Re}[c^\dagger z_k(i)] - \frac{1}{2} c^\dagger S_k(i) c \qquad (1.19)$$

where $$S_k(i) = H_k^\dagger(i) W_k(i) \qquad (1.20)$$

Figure 7:
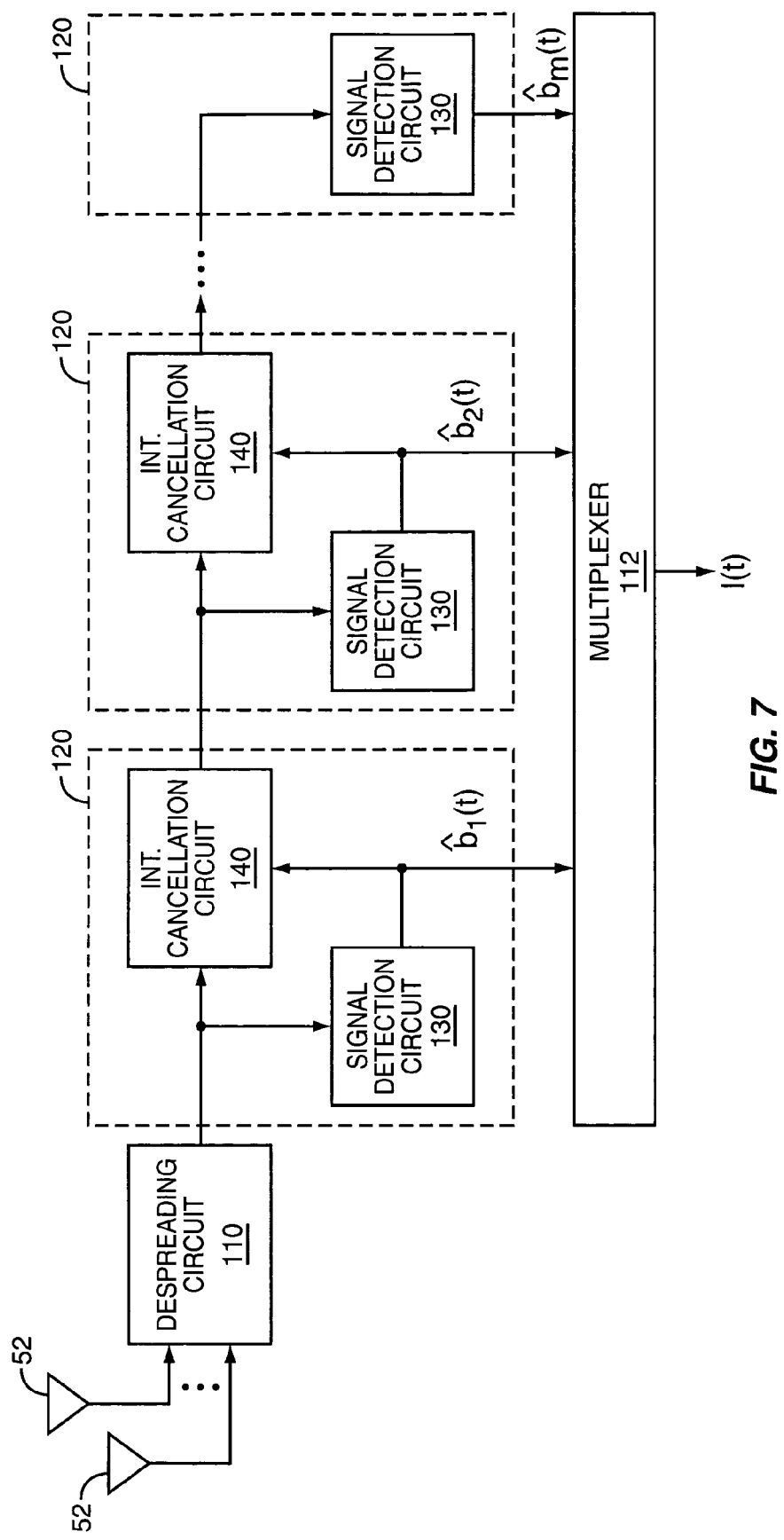
FIG. 7 is a successive interference cancellation receiver for the MIMO system shown in FIG. 1.

FIG. 7 illustrates a code specific successive interference cancellation GRAKE (CS-SIC-GRAKE) receiver 100 for a MIMO system 10 according to another exemplary embodiment. The CS-SIC-GRAKE receiver 100 comprises a despreading circuit 110 and a plurality of signal detection stages 120. The despreading circuit 110 despreads the received composite signal from each receive antenna 52. The despreading unit 50 shown in FIG. 3 may be used as a despreading circuit 110 in the CS-SIC-GRAKE receiver shown in FIG. 7. The received composite signal at each receive antenna 52 comprises M signals of interest transmitted from M transmit antennas 22 as previously described. The signals of interest may belong to one or more users. Each signal detection stage 120 detects one signal of interest transmitted from a respective transmit antenna 22. Multiplexer 112 combines the detected signals output from each signal detection stage 120 to produce an estimate $\hat{I}(t)$ of the original serial information stream $\hat{I}(t)$.

The despread vectors $y_k(i)$ output from the despreading circuit 110 are input to the first signal detection stage 120. The despread vectors $y_k(i)$ input to each successive signal detection stage 120 will be different due to the successive interference cancellation. Each signal detection stage 120 detects one of the signals of interest. Thus, the number of signal detection stages 120 equals the number of transmit antennas 22. Additionally, each signal detection stage 120 except for the last cancels the detected signal from the input signal for that signal detection stage 120 to generate the input signal for the next signal detection stage 120. Thus, detected signals are successively cancelled in each signal detection stage 120 until only one signal of interest remains by the time that the last signal detection stage 120 is reached. The input signals for the first M−1 stages will be composite signals, while the input signal to the last signal detection stage 120 contains a single signal of interest, which may be corrupted by residual inference attributable to the previously detected signals of interest that was not removed by interference cancellation.

As seen in FIG. 7, each signal detection stage 120 comprises a signal detection circuit 130 and an interference cancellation circuit 140. The GRAKE combining circuit 70 and decoding circuit 80 shown in FIGS. 4 and 5 are used as the signal detection circuit 130 in the CS-SIC-GRAKE receiver shown in FIG. 7. However, unlike the CS-MMSE-GRAKE receiver, the computation of the combining weight vector $w_{mk}(i)$ for each signal detection stage 120 is modified to account for the successive cancellation of previously detected signals. For the CS-SIC-GRAKE, the combining weight vector $w_{mk}(i)$ is given by $$w_{mk}(i) = R_y^{-1}(m;k,i) h_{mk}(i) \quad (1.21)$$

It should be noted that, unlike the CS-JD-GRAKE and CS-MMSE-GRAKE receivers, the despread covariance matrix $R_y(m;k,i)$ in CS-SIC-G RAKE is different for each signal detection stage 120 due to the cancellation of previously detected signals. The net response vector $h_{mk}(i)$ for the CS-SIC-GRAKE is the same as defined in (1.2).

$$\{h_{mk}(i)\}_q = \sqrt{\frac{\alpha_s(m) E_T}{K}} \sum_{p=1}^{P} g_{lmp} r_{kki\,0}(\tau_q - \tau_p) \quad (1.22)$$

which is the same as Equation 1.21 above. The despread covariance matrix is given by $$R_y(m;k,i) = R_s(m;k,i) + R_p(k,i) + R_v + R_n(k,i) \quad (1.23)$$

As shown in Eq. 1.23, the multicode covariance matrix $R_s(m;k,i)$ is different in each signal detection stage 120, and hence the despread covariance matrix $R_y(m;k,i)$ will also be different. The multiple access impairment matrix $R_v$, the pilot covariance matrix $R_p(k,i)$, and the noise impairment matrix $R_n(k,i)$ will be the same in all signal detection stages 120. The multicode impairment matrix $R_s(m;k,i)$ is given by $$\{R_s(m;k,i)\}_{q1,q2} = E_T \sum_{m'=m}^{M} \frac{\alpha_s(m')}{K} \cdot \sum_{p_1=1}^{P} \sum_{p_2=1}^{P} g_{l_1 m' p_1} g^*_{l_2 m' p_2} \quad (1.24)$$

$$\sum_{n=1}^{K} \sum_{j=\infty}^{\infty} r_{knij}(jT + \tau_{q_1} - \tau_{p_1}) r_{knij}(jT + \tau_{q_2} - \tau_{p_2})$$

The multiple access impairment matrix $R_v$, pilot impairment matrix $R_p(k,i)$, and noise impairment matrix $R_n(k,i)$ are the same as Equations 1.7, 1.8, and 1.9 above.

Figure 8:
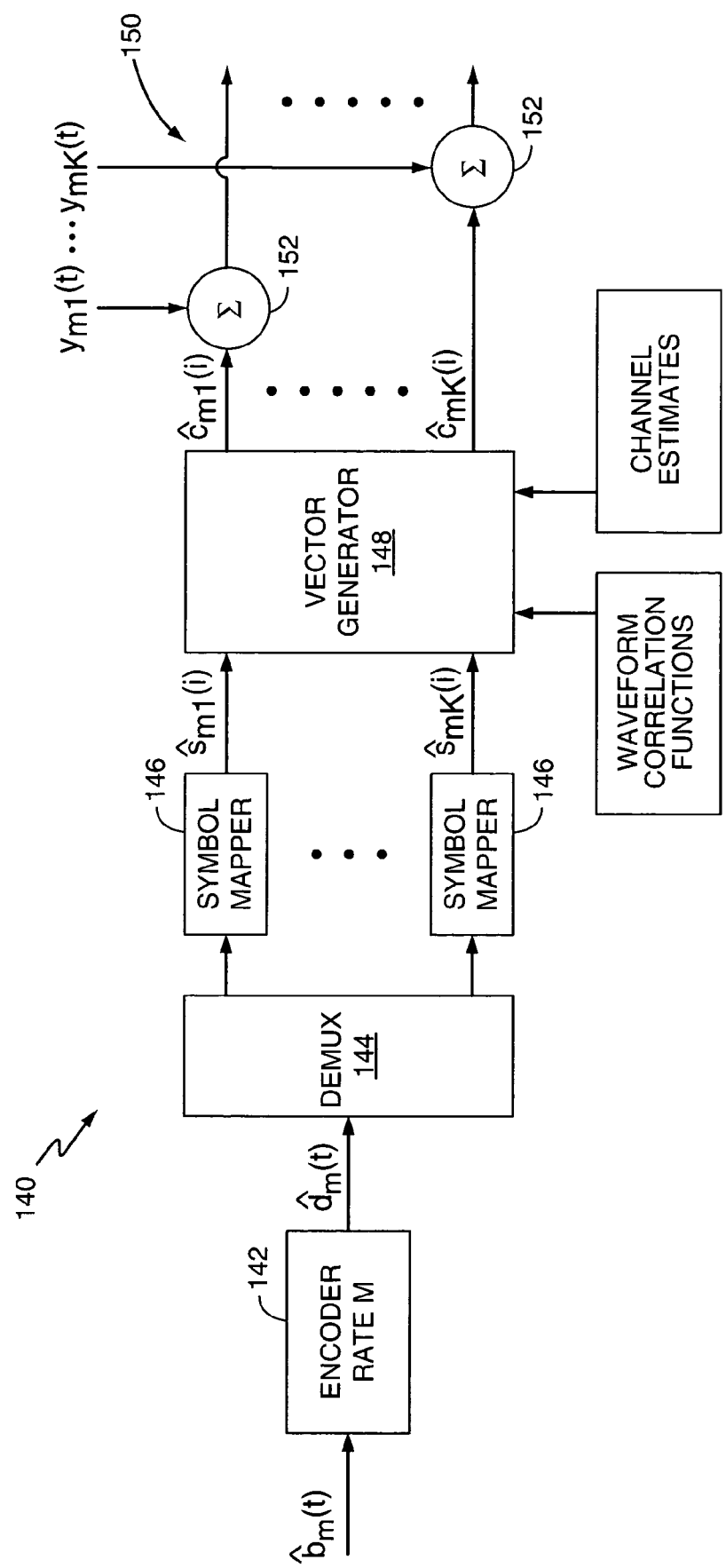
FIG. 8 illustrates an exemplary signal cancellation circuit for one stage of the SIC receiver shown in FIG. 7.

FIG. 8 illustrates an exemplary interference cancellation circuit 140 for the CS-SIC-GRAKE shown in FIG. 7. The interference cancellation circuit 140 comprises an encoder 142, demultiplexer 144 coupled to the output of encoder 142, a plurality of symbol mappers 146, a vector generator 148, and a summing circuit 150. The encoder 142, demultiplexer 144, and symbol mappers 146 may be configured like the corresponding functional components at the transmitter 20. Encoder 142 re-encodes the estimate $\hat{I}(t)$ output from the decoder 86 to generate an estimate of the coded data signal $\hat{d}_m(t)$ transmitted by the mth transmit antenna 22. Demultiplexer 144 divides the estimate of the coded data signal $\hat{d}_m(t)$ into substreams and symbol mappers 146 map the substreams to corresponding modulation symbols to generate estimates $\{\hat{s}_{mk}(i)\}_{k=1}^K$ of the symbols transmitted on each code channel for the mth transmit antenna 120.

Vector generator 148 generates the vector component of the despread vectors attributable to the estimated transmit symbols $\{\hat{s}_{mk}(i)\}_{k=1}^K$ using the waveform cross-correlations and estimates of the channel between the mth transmit antenna 120 and the L receive antennas 42. The output of the vector generator 148 is a set of cancellation vectors $\{c_{mk}(i)\}_{k=1}^K$, where each reconstructed cancellation vector $c_{mk}(i)$ corresponds to a respective code channel. The channel estimates are obtained from the common pilot channel in a conventional manner and are scaled by the fraction of power allocated to the pilot. Consequently, the reconstructed interference vectors must be scaled by the power offset between the common pilot channel and the data channel in order to completely remove the interference from the mth transmit antenna 22. Summing circuit 150 comprises a plurality of summers 152 to combine the cancellation vectors $\{\hat{c}_{mk}(i)\}_{k=1}^K$ with the despread vectors $\{y_{mk}(i)\}_{k=1}^K$ input to the signal detection stage 120 to cancel the interference attributable to the detected signal of interest from the input signal to the next signal detection stage 120. Note that in the CS-SIC-GRAKE, the despread vectors $\{y_{mk}(i)\}_{k=1}^K$ will vary from one stage to the next. In contrast, the same despread vector is used by each signal detection circuit in the CS-MMSE-GRAKE receivers shown in FIGS. 5 and 6.

It will be apparent to those skilled in the art that the cancellation vectors $\{\hat{c}_{mk}(i)\}_{k=1}^K$ may be generated from the soft values output by soft-value generators 82 without benefit of any decoding operations. In such cases, the interference cancellation circuit 140 would not use encoder 142.

Figure 9:
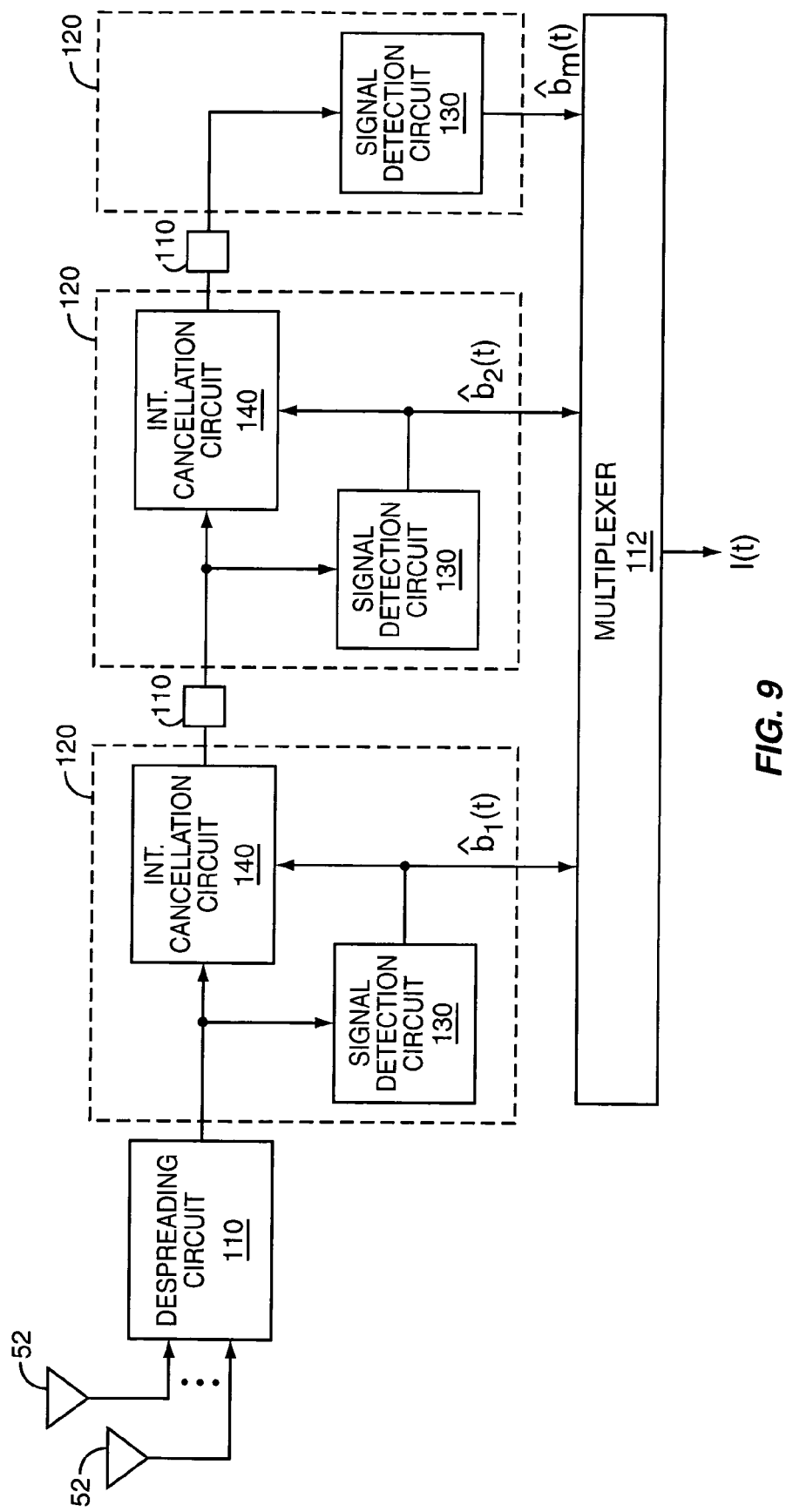
FIG. 9 illustrates a successive interference cancellation (SIC) receiver for the MIMO communication system of FIG. 1.

FIG. 9 illustrates an alternative embodiment of the CS-SIC-GRAKE. In this embodiment, a despreading circuit 110 precedes each signal detection stage 120 and the interference cancellation circuit 140 cancels interference from spread signals than despread signals. This approach allows RAKE finger placements to be optimized at each signal detection stage 120. The trade-off is that despreading and respreading must be performed at each stage 120 as part of signal detection and interference cancellation. The despreading unit 50 shown in FIG. 4 may be used as a despreading circuit 110 in the CS-SIC-GRAKE receiver shown in FIG. 9. The GRAKE combining circuit 70 and decoding circuits 80 shown in FIGS. 4 and 5 can be used as the signal detection circuit 130 in the CS-SIC-GRAKE receiver shown in FIG. 9.

Figure 10:
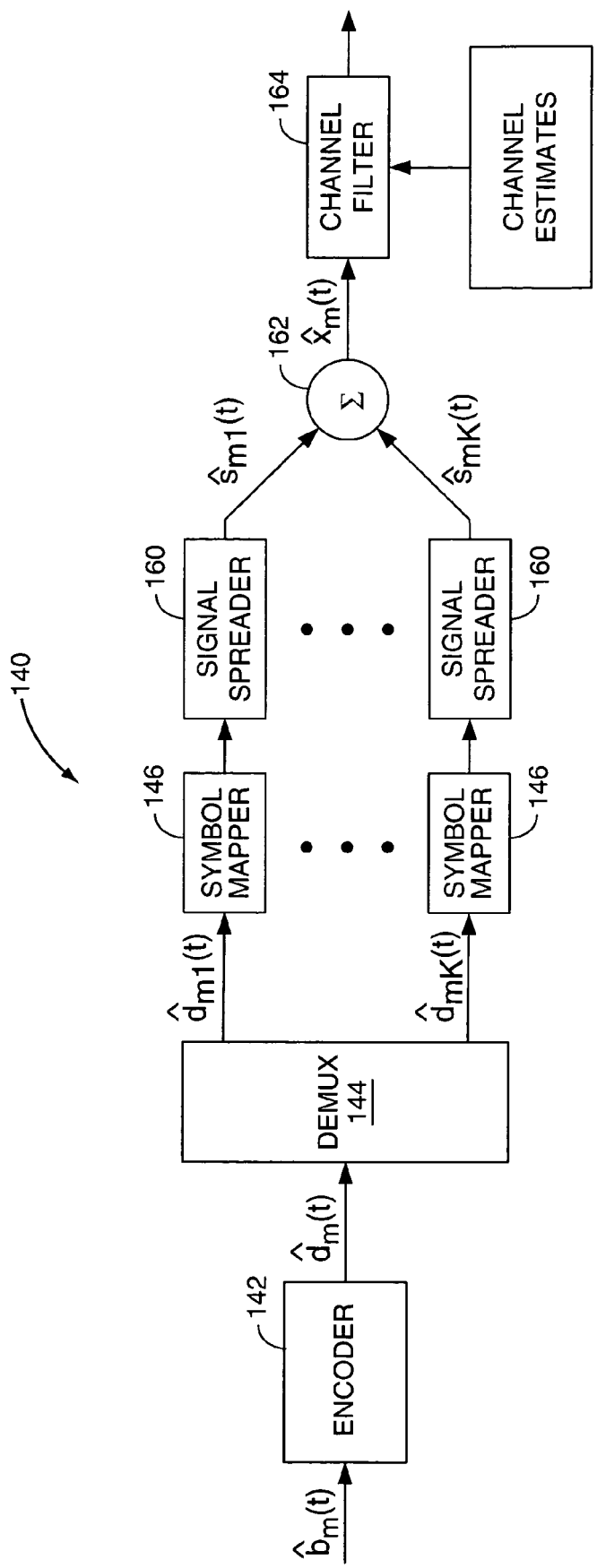
FIG. 10 is an exemplary signal cancellation circuit for the SIC receiver shown in FIG. 9.

FIG. 10 illustrates an exemplary interference cancellation circuit 140 for the CS-SIC-GRAKE shown in FIG. 9. The interference cancellation circuit 140 comprises an encoder 142, demultiplexer 144, and a plurality of symbol mappers 146 which are identical to those shown in FIG. 8. Encoder 142 re-encodes the estimate $\hat{b}_m(t)$ output from the decoder 86 to generate an estimate of the coded data signal $\hat{d}_m(t)$ transmitted by the mth transmit antenna 22. Demultiplexer 144 divides the estimate of the coded data signal $\hat{d}_m(t)$ into substreams and symbol mappers 146 map the substreams to corresponding modulation symbols to generate estimates $\{\hat{s}_{mk}(i)\}_{k=1}^{K}$ of the symbols transmitted on each code channel for the mth transmit antenna 120. Spreaders 160 spread the symbol estimates $\{\hat{s}_{mk}(i)\}_{k=1}^{K}$ output from the symbol mappers 146 using the same spreading codes employed by the transmitter 10. The encoder 142, demultiplexer 144, symbol mappers 146, and spreaders 160 may be configured like the corresponding functional components at the transmitter 20. Combiner 162 combines the spread signals to form an estimate of the transmit signal $\hat{x}_m(t)$ corresponding to the mth coded signal. Channel filter 164 filters the estimated transmit signal $\hat{x}_m(t)$ using the estimated channel coefficients associated with the mth transmit antenna 22. Separate channel filtering within channel filter 255 may be used for each receive antenna 42 to reflect the particular channel characteristics from the mth transmit antenna 22 to the Lth receive antenna 42. The filtered signals output from the channel filter 255 are then subtracted from the spread spectrum signal that was input to that signal detection stage 120.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A receiver for processing a received spread spectrum signal containing one or more signals of interest transmitted from a plurality of transmit antennas and one or more known interfering signals with known spreading codes, said receiver comprising:
   a despreading circuit including a plurality of correlators to generate despread signals corresponding to said signals of interest and to said interfering signals;
   a channel estimation unit to generate channel estimates corresponding to the signals of interest transmitted from the transmit antennas; and
   at least one signal detection circuit to detect said signals of interest, said signal detection stage including a combiner to combine the despread signals using combining weights calculated based on the channel estimates corresponding to the signals of interest transmitted from the transmit antennas and spreading code correlations between spreading codes for the signals of interest and spreading codes for the known interfering signals to reduce interference in the signals of interest attributable to the known interfering signals.

2. The receiver of claim 1 further comprising:
   a covariance estimator to calculate covariance between the signals of interest and the known interfering signals based on said spreading code correlations; and
   a combining weight calculator to calculate said combining weights based on the covariance estimate.

3. The receiver of claim 2 further comprising a channel estimator to generate channel estimates for the signals of interest and the known interfering signals, wherein said channel estimates are used by said covariance estimator to calculate said covariance estimates and by said combing weight calculator to calculate said combining weights.

4. The receiver of claim 2 wherein the covariance estimator further calculates covariance estimates based on averaged spreading code correlations between the spreading codes for the signals of interest and the unknown interfering signals.

5. The receiver of claim 2 wherein the received spread spectrum signal contains one or more pilot signals and wherein said covariance estimator further calculates pilot covariance between the signals of interest and the pilot signals.

6. The receiver of claim 2 wherein the covariance estimator further calculates noise covariance between the signals of interest and the thermal noise contained in the received spread spectrum signal.

7. The receiver of claim 1 wherein the signals of interest are transmitted from a plurality of transmit antennas.

8. The receiver of claim 7 wherein the signals of interest are transmitted over multiple code channels.

9. The receiver of claim 8 wherein at least two signals of interest are transmitted from different transmit antennas over the same code channel.

10. The receiver of claim 8 wherein at least two signals of interest are transmitted from the same transmit antenna over different code channels.

11. The receiver of claim 8 wherein at least one signal of interest and one known interfering signal are transmitted over the same code channel from different transmit antennas.

12. The receiver of claim 8 wherein at least one signal of interest and one known interfering signal are transmitted over different code channels from the same transmit antenna.

13. The receiver of claim 1 wherein the signals of interest and the interfering signals are transmitted concurrently in the same symbol period.

14. The receiver of claim 13 including a plurality of signal detection circuits to detect respective ones of said signals of interest.

15. The receiver of claim 14 wherein said signal detection circuits are arranged in parallel to process the received signal in parallel.

16. The receiver of claim 14 wherein said signal detection circuits are arranged in series to sequentially process said signals of interest.

17. The receiver of claim 16 wherein each signal detection circuit after a first signal detection circuit receives an input signal from the previous signal detection circuit and wherein each signal detection circuit prior to a last signal detection circuit includes an interference cancellation circuit to cancel the signal of interest detected in that signal detection circuit from the input signal to that signal detection circuit to generate an input signal for the next signal detection circuit.

18. The receiver of claim 13 wherein the signal detection circuit jointly detects two or more signals of interest.

19. The receiver of claim 1 further comprising a pilot cancellation circuit to subtract pilot signals contained in the received spread spectrum signal before despreading.

20. The receiver of claim 1 wherein the covariance estimate comprises an estimate of despread value covariance.

21. The receiver of claim 1 wherein the covariance estimate comprises an estimate of impairment covariance.

22. A method of processing a received spread spectrum signal containing one or more signals of interest and one or more known interfering signals, said method comprising:
   correlating the received spread spectrum signal with spreading codes corresponding to said signals of interest and to said known interfering signals to generate despread signals; and
   detecting said signals of interest by combining the despread signals using combining weights calculated based on spreading code correlations between spreading codes for the signals of interest and spreading codes for the known interfering signals to reduce interference in the signals of interest attributable to the known interfering signals.

23. The method of claim 22 further comprising estimating covariance between the signals of interest and the known interfering signals based on said spreading code correlations, and calculating said combining weights based on said covariance estimates.

24. The method of claim 23 further comprising generating channel estimates for the signals of interest and the known interfering signals, wherein said channel estimates are used to calculate said covariance estimates and said combining weights.

25. The method of claim 23 further comprising estimating covariance between the signals of interests and unknown interfering signals spread with unknown spreading codes to reduce interference attributable to the unknown interfering signals.

26. The method of claim 23 further comprising estimating pilot covariance between the signals of interest and the pilot signals contained in the spread spectrum signal, and using said pilot covariance estimates to calculate said combining weights to reduce interference attributable to said pilot signals.

27. The method of claim 23 further comprising estimating noise covariance correlations between the signals of interest and the thermal noise contained in the received spread spectrum signal, and using said pilot impairment correlations to calculate said combining weights to reduce interference attributable to said noise.

28. The method of claim 22 wherein the signals of interest are transmitted from a plurality of transmit antennas.

29. The method of claim 28 wherein the signals of interest are transmitted over multiple code channels.

30. The method of claim 29 wherein at least two signals of interest are transmitted from different transmit antennas over the same code channel.

31. The method of claim 29 wherein at least two signals of interest are transmitted from the same transmit antenna over different code channels.

32. The method of claim 29 wherein at least one signal of interest and one known interfering signal are transmitted over the same code channel from different transmit antennas.

33. The method of claim 29 wherein at least one signal of interest and one known interfering signal are transmitted over different code channels from the same transmit antenna.

34. The method of claim 22 wherein the signals of interest and the interfering signals are transmitted concurrently in the same symbol period.

35. The method of claim 34 wherein said signals of interest are detected by a plurality of parallel signal detection circuits.

36. The method of claim 34 wherein said signals of interest are detected by a plurality of signal detection circuits connected in series such that an input signal for each signal detection circuit after the first detection circuit is provided by the previous signal detection circuit.

37. The method of claim 36 further comprising canceling the signal of interest detected in each signal detection circuit before the last signal detection circuit from the input signal to that signal detection circuit to generate the input signal for the next signal detection circuit.

38. The method of claim 22 further jointly detecting two or more signals of interest.

39. The method of claim 22 further comprising subtracting pilot signals contained in the received spread spectrum signal before despreading.

40. The method of claim 23 wherein estimating covariance between the signals of interest and the known interfering signals based on said spreading code correlations comprises despread value covariance.

41. The method of claim 23 wherein estimating covariance between the signals of interest and the known interfering signals based on said spreading code correlations comprises impairment covariance.

* * * * *

UNITED STATES PATENT AND TRADEMARK OFFICE
CERTIFICATE OF CORRECTION

PATENT NO. : 7,668,227 B2
APPLICATION NO. : 11/443883
DATED : February 23, 2010
INVENTOR(S) : Grant et al.

It is certified that error appears in the above-identified patent and that said Letters Patent is hereby corrected as shown below:

In Column 4, Line 48, delete "$\alpha_m(t)$" and insert -- $a_m(t)$ --, therefor.

In Column 6, Line 54, in Equation (1.2), delete "$= \sqrt{\dfrac{\alpha_s(m)E_T}{K}} \sum_{p=1}^{P} g_{imp} r_{kki0}(\tau_q - \tau_p)$"

and insert -- $= \sqrt{\dfrac{\alpha_s(m)E_T}{K}} \sum_{p=1}^{P} g_{imp} r_{kki0}(\tau_q - \tau_p)$ --, therefor.

In Column 6, Line 63, delete "Ah" and insert -- ith --, therefor.

In Column 7, Line 30, delete "$C_{knij}(\mu)$," and insert -- $C_{knij}(u)$, --, therefor.

In Column 9, Line 49, delete "Ah" and insert -- ith --, therefor.

Signed and Sealed this

Third Day of August, 2010

David J. Kappos
*Director of the United States Patent and Trademark Office*